(12) United States Patent
Yang

(10) Patent No.: US 11,250,888 B1
(45) Date of Patent: Feb. 15, 2022

(54) FLASH MEMORY AND METHOD FOR STORING AND RETRIEVING EMBEDDED AUDIO VIDEO DATA

(71) Applicant: SHANGHAI IMILAB TECHNOLOGY CO., LTD., Shanghai (CN)

(72) Inventor: Yang Yang, Shanghai (CN)

(73) Assignee: SHANGHAI IMILAB TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/371,059

(22) Filed: Jul. 8, 2021

(30) Foreign Application Priority Data

Dec. 14, 2020 (CN) .......................... 202011465681.0

(51) Int. Cl.
*H04N 9/80* (2006.01)
*G11B 27/10* (2006.01)

(52) U.S. Cl.
CPC ................. *G11B 27/102* (2013.01)

(58) Field of Classification Search
CPC ................................................... G11B 27/102
USPC .......................... 386/241, 239, 243, 248, 326
See application file for complete search history.

(56) References Cited

U.S. PATENT DOCUMENTS

| 7,486,827 | B2* | 2/2009 | Kim | .................. G06K 9/00758 |
| | | | | 382/209 |
| 2013/0315301 | A1* | 11/2013 | Shiozawa | ............ H04N 19/124 |
| | | | | 375/240.03 |
| 2016/0212422 | A1* | 7/2016 | Chen | ..................... H04N 19/46 |

FOREIGN PATENT DOCUMENTS

| CN | 102025956 A | 4/2011 |
| CN | 102857834 A | 1/2013 |
| CN | 108132845 A | 6/2018 |
| CN | 108710578 A | 10/2018 |
| CN | 111143285 A | 5/2020 |

OTHER PUBLICATIONS

DERWENT-ACC-No. 2019-53080Q dated Jan. 2019.*

* cited by examiner

*Primary Examiner* — Robert Chevalier
(74) *Attorney, Agent, or Firm* — Fideli Law PLLC

(57) ABSTRACT

A method, a device and a flash memory for storing, retrieving and deleting embedded audio video data are disclosed. The flash memory includes several partitions, where each partition includes: a main node partition to store metadata information of the partition; an inode partition, including at least one inode queue including several inodes corresponding to a same audio video track, where each inode is used to store timestamp information and storage location information of one frame of audio video data in the corresponding audio video track; and each inode in an inode queue is arranged according to a storage time sequence of the corresponding frame of audio video data; and a main storage partition, including several data blocks to store the audio video data, where at least one data block corresponds to a same inode.

19 Claims, 7 Drawing Sheets

Obtain a free data block after obtaining an nth frame of audio and video data, where the nth frame of audio and video data is any frame of to-be-stored audio and video data, and the to-be-stored audio and video data include N frames of data, $N \geq 1$ — 21

Store the $n^{th}$ frame of audio and video data in the free data block — 22

Obtain an free inode from an inode queue corresponding to the to-be-stored audio and video data as an inode of the $n^{th}$ frame of audio and video data, and store information about the $n^{th}$ frame of audio and video data in storage space corresponding to the inode of the $n^{th}$ frame of audio and video data — 23

Update the inode queue corresponding to the to-be-stored audio and video data, such that each inode is arranged according to storage time of a corresponding frame of audio and video data — 24

FLASH MEMORY AND METHOD FOR STORING AND RETRIEVING EMBEDDED AUDIO VIDEO DATA

RELATED APPLICATIONS

This application is a continuation application of Chinese application No. 202011465681.0, filed on Dec. 14, 2020, and the content of which is incorporated herein by reference in its entirety.

TECHNICAL FIELD

This disclosure relates to the field of memory technology, and in particular to a flash memory, a method and a device for storing, retrieving, and deleting embedded audio video data of the flash memory.

BACKGROUND

With the development of the Internet of Things, smart cameras are used much more widely. An important function of the smart cameras is to record and play back surveillance videos.

When a video is being played back, a user can drag the time on a timeline shown on an operation interface to adjust the starting time from which the video will be played back next, so as to view an event that happened at that moment. In addition, a smart camera may also run a complex artificial intelligence (AI) algorithm to parse a picture in the video, and extract structured video information therefrom. For example, the structured information such as people, pets and their behavior may be recorded by the smart camera as structured annotations of the video. Based on these annotations, a user may perform semantic retrieval in a way similar to using a search engine.

Generally, the existing smart cameras use an embedded Linux operating system, and may use a flash card such as a trans-flash (TF) card or secure digital (SD) memory card as a storage medium for audio video data. In this disclosure, the audio video data stored in the Flash of a smart camera with an embedded system is referred to embedded audio video data.

However, in the embedded system, the Flash file system supported by the Linux virtual file system (VFS) is used to manage the audio video data stored in the Flash, which is not optimized for a specific application of the audio video data, such that the retrieval and deletion efficiency of the audio video data is undesirable.

SUMMARY

The technical problem to be solved by the present disclosure is to improve the retrieval or deletion efficiency of embedded audio video data.

To solve the above technical problem, one aspect of this disclosure provides a non-transitory computer-readable storage medium, including: a main storage partition configured to store target data, the target data including a plurality of frames of data; an index node (inode) partition configured to store a plurality of inodes, forming an inode queue, where each inode includes indexing information of one or more of the frames in the target data, so as to facilitate retrieving of one or more frames corresponding to the inode.

Another aspect of this disclosure provides a method for storing target data in at least one storage medium, including: obtaining an $n^{th}$ frame of data of the target data, the target data including N frames of data, where N is a natural number and $n \leq N$; storing the $n^{th}$ frame of data in one or more free data blocks in a main storage partition of the at least one storage medium; obtaining, from an index node (inode) partition of the at least one storage medium, a free inode in an inode queue corresponding to the target data; storing indexing information of the $n^{th}$ frame of data in a space corresponding to the free inode, so as to facilitate retrieving of the $n^{th}$ frame of data; and updating the inode queue so that inodes in the inode queue are arranged according to a storage time sequence of the corresponding n frames of data.

Yet another aspect of this disclosure provides a method for retrieving target data from at least one storage medium, including: receiving identification information of the target data and timestamp information of an $i^{th}$ frame of data, where the target data includes N frames of data, N is a natural number, $i \leq N$; determining a target index node (inode) queue corresponding to the target frame based on metadata information stored in a main node partition of the at least one storage medium; searching for a target inode corresponding to the target timestamp information in the target inode queue; and outputting, based on a search result, a frame of the target data corresponding to the target inode.

Compared with the existing technologies, the technical solution provided in the embodiments of this disclosure has the following advantages.

In the scheme of this disclosure, the flash memory may be divided into a main node partition, an inode partition and a main storage partition. The inode partition includes at least one inode queue, where the inode queue includes several inodes corresponding to a same audio video track; each inode is used to store timestamp information and storage location information of one frame of audio video data in a corresponding audio video track, such that the audio video data may be quickly stored in the flash memory in a unit of frame. Since each inode in a same inode queue is arranged according to storage time of the corresponding frame audio video data, and each inode stores the timestamp information of the corresponding frame of audio video data, when retrieving, target timestamp information may be directed compared with timestamp information stored in each inode to obtain a retrieval result. In this way, the process of retrieving may not include searching a file and then reading and analyzing corresponding video content in the file, such that the retrieval efficiency is greatly improved.

In the scheme of this disclosure, the flash memory may be divided into a main node partition, an inode partition and a main storage partition. The inode partition includes at least one inode queue, where the inode queue includes several inodes corresponding to a same audio video track; each inode is used to store timestamp information and storage location information of one frame of audio video data in a corresponding audio video track, such that the audio video data may be quickly stored in the flash memory in a unit of frame. Since each inode in a same inode queue is arranged according to storage time of the corresponding frame audio video data, when deleting embedded audio video data, audio video data that is written earliest in the flash memory may be quickly found, and a corresponding data block may be released. In this way, the process of deleting may not include searching a file and then reading and analyzing corresponding video content in the file, such that the deletion efficiency is greatly improved.

DETAILED DESCRIPTION

Figure 1:
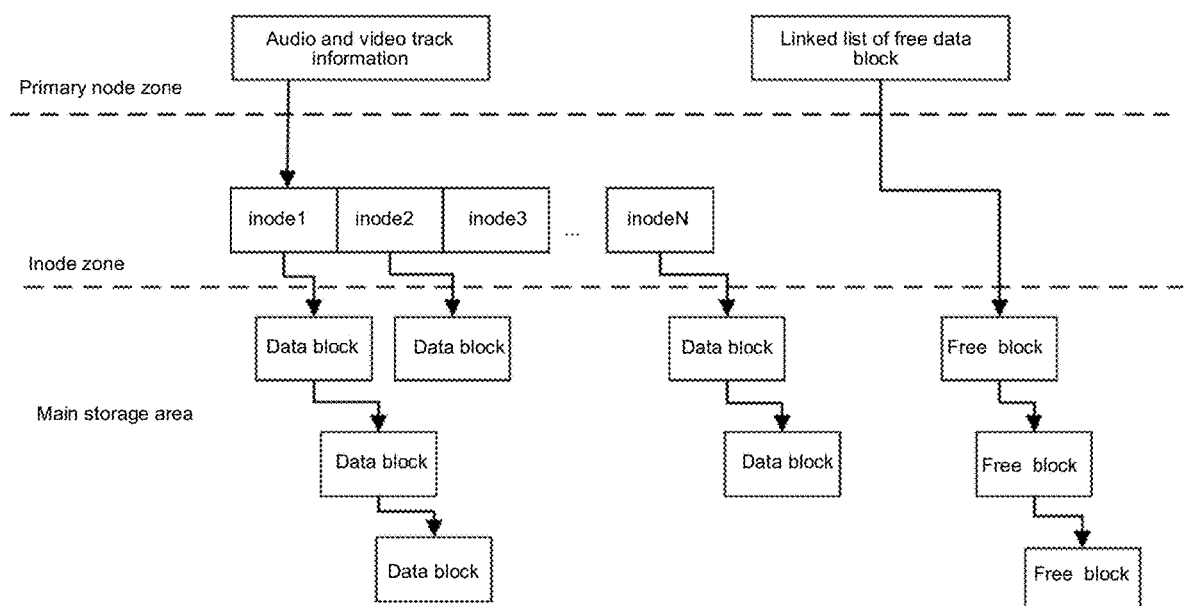
FIG. 1 is a schematic structural diagram of a flash memory according to some exemplary embodiments of this disclosure.

Generally, existing smart cameras use an embedded Linux operating system, and may use a flash card such as a TF card or an SD card as a storage medium for audio video data. Certainly, the present disclosure is not limited to the flash memory, but includes any type of non-transitory computer-readable storage medium. The embedded Linux operating system refers to a special Linux operating system suitable for specific embedded applications, which can be solidified in a memory chip or a single-chip microcomputer with a capacity of only a few kilobytes or a few megabytes after miniaturizing a standard Linux.

In the embedded field, the Flash file system supported by the Linux virtual file system (VFS) is used to manage the audio video data stored in the Flash. Commonly used Flash file systems include jffs2, yaffs, logfs, ubifs, and so on.

The file systems mentioned above are designed for general file management and are not optimized according to features of a video. Therefore, when reading video data in the form of a file, it is usually necessary to perform traversal in the file to obtain relevant information. In a jump and retrieval, reading and positioning may be performed for multiple times in the file system in order to find corresponding data contents, which is very inefficient.

For example, to find a video data frame at a specified time point, an approximate file name corresponding to the time point need to be found first, the file is then opened, relevant video file content is read, file data is parsed, and timestamps of the video frames are compared in a file stream until video frame data that meets the requirement is found. In this process, the file contents needs to be read repeatedly, which is very time-consuming. When dragging along a timeline to browse the video or quickly jump to find a target according to the video standard, the video stutters, causing poor user experience.

In addition, when the capacity of the flash memory card is fully occupied and it is necessary to delete previous videos in loops, the video storage mode based on the file system also needs to traverse the files to find the earliest file. Thus, the efficiency is not high enough when deleting files.

In view of the above problem, this disclosure provides a flash memory and corresponding storage, retrieval, and deletion methods. The flash memory may be divided into a main node partition, an inode partition and a main storage partition, where the inode partition includes at least one inode queue, the inode queue includes several inodes corresponding to a same audio video track; each inode is used to store timestamp information and storage location information of one frame of audio video data in a corresponding audio video track, such that the audio video data may be quickly stored in the flash memory in a unit of frame. Therefore, the retrieval and deletion efficiency of the flash memory may both be improved.

To make the above objects, features, and advantages of this disclosure more obvious and easier to understand, some exemplary embodiments of this disclosure will be described in detail with reference to the accompanying drawings.

Referring to FIG. 1, a flash memory is provided according to some exemplary embodiments of this disclosure. The flash memory may include several partitions, where each partition may include a main node partition, an index node (inode) partition and a main storage partition.

The main node partition may include a plurality of data blocks, and the plurality of data blocks are used to store target data. The target data includes one or several frames of data. In some exemplary embodiments, the target data may be audio data of a target audio, video data of a target video, audio video data of a target audio video, or other types of data that carry audio and/or video information. The target audio may include multiple frames of audio, and the target video may include multiple frames of video. Correspondingly, the multiple frames of data may be multiple frames of audio data, multiple frames of video data, multiple frames of audio video data, or multiple frames of the other types of data. For ease of presentation, audio video data is used as an example for description in this disclosure. However, those skilled in the art can understand that any data including multiple frames of data is applicable to the technical solutions disclosed herein without departing from the scope of this disclosure.

The inode partition may include at least one inode queue, and the at least one inode queue may include a plurality of inodes corresponding to the same audio video track. Each inode is used to store the index information (for example, pointer, time stamp information and storage location information, etc.) of a certain frame of audio video data in the corresponding audio video track, so as to allow a retrieving device (for example, a retrieving control device) to retrieve the storage location of the corresponding audio video frame according to the index information. For example, each inode may store the time stamp and address data of the audio video frame data in the corresponding data block in the main storage partition. In addition, each inode in the inode queue is arranged according to storage time of the corresponding frame of the audio video data.

The main storage partition may include the main node partition, and include metadata information of the partition where it is located. The metadata information is "the data that provides information about the audio video track data."

For example, the metadata may include overall index information of the audio video data, the head address of the queue of a certain inode queue in the inode partition, or the address of the audio video data directly pointing to the main storage partition, so that the retrieving device may find the audio video data accordingly.

In some exemplary embodiments, the main node partition, the inode partition and the main storage partition of each partition may be created once at the initial partition.

The main node partition may include 2 main node blocks of the entire partition. Both main node blocks have the same content, one is a current active main node block; the other is a backup main node block, which may be restored as a backup when the active main node is damaged.

In some exemplary embodiments, the main node partition includes 2 main node blocks, one is a current active main node block; the other is a backup main node block. The backup main node block restored a backup in case the current active main node block is damaged.

In the specific implementation, the main node partition is used to store metadata information of the partition. The metadata information of the partition includes geometric information of a chip where the flash memory is located, erase block size information of the chip where the flash memory is located, index node (hereinafter "inode") queue information corresponding to an audio video track in the partition, management linked list header information of free data blocks in the partition, and the like. Based on the information recorded in the main node block, information about the entire partition may be obtained. Here, the inode is a data structure in a Unix-style file system that describes a file-system object such as a file or a directory. Each inode stores the attributes and disk block locations of the object's data. File-system object attributes may include metadata (times of last change, access, modification), as well as owner and permission data.

In some exemplary embodiments, the inode may be seen as an index of the stored audio video data. The audio video data is organized and managed based on frames of audio video. Each inode records key information of a frame of audio video data, and a corresponding storage location of the audio video data.

The inode function of this disclosure is similar to the inode function of a standard Linux file system, except that the inode in the Linux file system records meta information of the file, while the inode in this disclosure records meta information of each frame of audio video.

In this disclosure, information recorded by the inode may include: timestamp information of each frame of audio video, frame header information, sequence parameter set (SPS), picture parameter set (PPS), supplemental enhancement information (SEI), and the like. In addition, it may further include first data block address information corresponding stored audio video data. When an inode corresponding to a frame of audio video is read, the corresponding audio video data may be read directly by addressing based on the address.

The inode partition includes a plurality of loop queues for storing inodes. Each loop queue corresponds to an audio video track, and the inodes of all audio video frames in the same video are stored in sequence in the loop queue. The number of inodes in the inode loop queue is not limited. For example, in FIG. 1, the inode loop queue includes N inodes.

In some exemplary embodiments, the number of video recordings that a Flash partition can support, that is, the number of inode loop queues, may be determined during the initialization of partition based on the actual number of video recordings stored in an embedded device. For example, in the case where a common camera can only record one video at a time, only one inode loop queue needs to be initialized in the partition. In the case where a camera can record 2 video streams at a time, 2 inode loop queues need to be initialized in a storage partition. The maximum length supported by the loop queue also needs to be associated with a size of the storage partition, and a size of each storage data block, so as to ensure that the length of the inode queue matches the data blocks managed thereby to avoid wasting the storage space.

In general, the size of the inode loop queue is calculated with the following formula:

inode queue size=(total number of data blocks*size of each data block)/average size of data frames.

In some exemplary embodiments, when the inode loop queue space is allocated for the same audio video, a continuous section of address space may be allocated to store inodes. In this case, information stored in the main node block that relates to the inode queue corresponding to the audio video track in the partition main may be location information of the inode at the start of the inode loop queue and location information of the inode at the end of the inode loop queue. Since the storage space of the inode loop queue is continuous, all audio video data queues may be obtained according to the location information of the inode at the start of the queue and the location information of the inode at the end of the queue.

The inodes in the inode loop queue form an array, and the inodes may be identified by an array subscript. After the to-be-accessed inode is determined, the inode may be directly addressed according to the array subscript corresponding to the inode.

In some exemplary embodiments, due to the features of acquiring audio video, the audio video data are generated in a sequence of acquisition time, and inodes may be stored in a sequence of acquisition time.

In some exemplary embodiments, inodes may be stored in an inode loop queue in the sequence of acquisition time from the start to the end of the queue, that is, the inode that corresponds to the audio video data and that is acquired earliest is located at the start of the inode loop queue, and the inode that corresponds to the audio video data and that is acquired latest is located at the end of the inode loop queue.

The main storage may include data nodes in the entire partition system. Since the Flash is a block electronic device, it can be accessed randomly in a unit of data block, so when the audio video data is accessed, it can be indexed and accessed directly according to the addresses of the data blocks recorded in the inode. For data that cannot be stored in a single data block, a plurality of blocks may be organized in the form of a linked list. For an un-used data block, which is a free block, it is managed by using a free data block linked list recorded in the main node partition.

Figure 2:
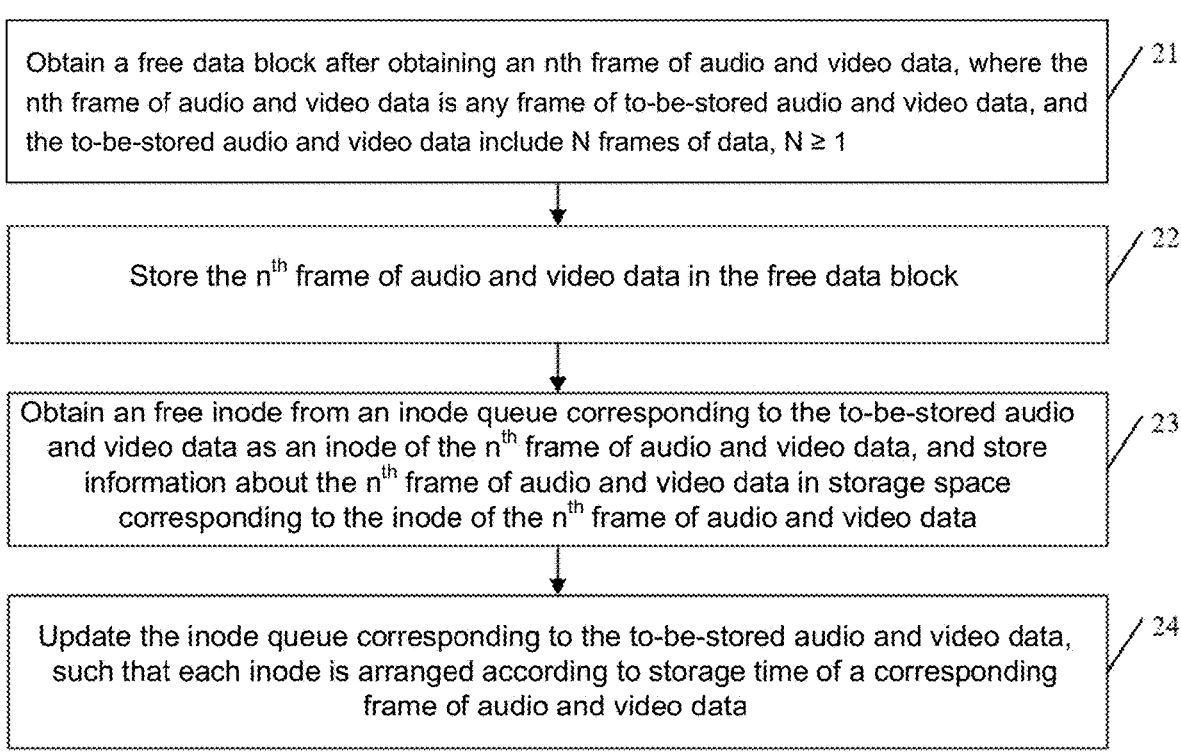
FIG. 2 is a flowchart of a method for storing embedded audio video data according to some exemplary embodiments of this disclosure.
Figure 8:
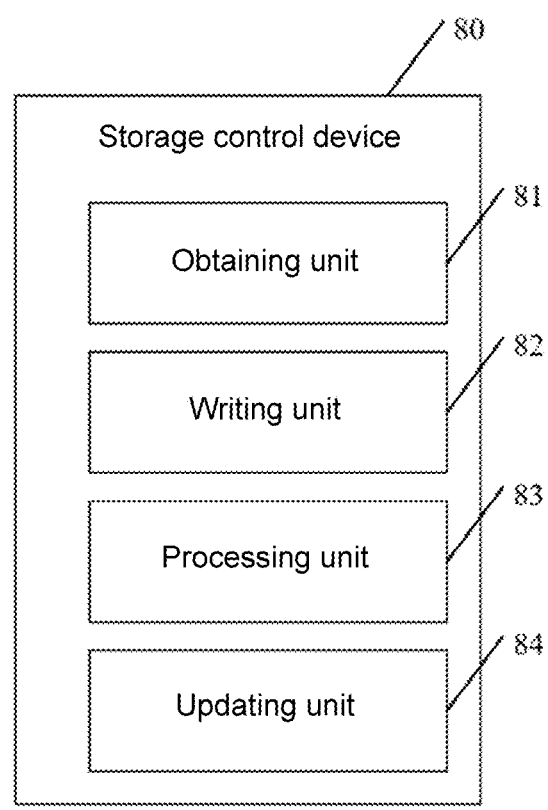
FIG. 8 is a schematic structural diagram of a storage control device for embedded audio video data according to some exemplary embodiments of this disclosure.

Referring to FIG. 2, this disclosure further provides a storage method for storing embedded audio video data, where the method is used to store the audio video data in the flash memory. Specifically, each frame of audio video data may be stored in the flash memory in a unit of frame by using the following method. The method may be executed by an electronic storage control device 80, as shown in FIG. 8.

Step 21: Obtain a data block after obtaining an $n^{th}$ frame of audio video data, where the $n^{th}$ frame of audio video data is any frame of to-be-stored audio video data, and the to-be-stored audio video data includes N frames of data, where N≥1. According to some exemplary embodiments, if a current data block is not fully occupied (the data saved in the block is not full), then the storage control device 80 may obtain the current data block; if the current data block is full or the un-used portion of the current data block is smaller than the $n^{th}$ frame of audio video data, than the obtaining of the data block may include obtaining a free data block.

Step 22: Store the $n^{th}$ frame of audio video data in the free data block.

With reference to step 21 and step 22, taking video recording as an example, when a recorded video is being stored, the camera's audio video codec generates a frame of audio video data, one free data block is first applied for from a linked list of free data block and the data is written into the data block. If the linked list of free data block does not have sufficient free data blocks, an earliest frame of audio video data in the flash memory is retrieved and a corresponding data block is released. In other words, the frame of audio video data that is stored earliest is found from all loop queues and the corresponding data block is released.

If current to-be-stored audio video data is greater than the size of a data block, the process of applying for a free data block may be repeated. When the free data blocks are insufficient, the data block stored the earliest frame of audio video data may be released until all the audio video data is stored.

Step 23: Obtain a free inode from an inode queue corresponding to the to-be-stored audio video data as an inode of the $n^{th}$ frame of audio video data, and store information of the $n^{th}$ frame of audio video data in storage space corresponding to the inode of the $n^{th}$ frame of audio video data.

After the audio video data is stored, a next free inode is obtained from an inode loop queue corresponding to a current audio video track, and corresponding frame information and timestamp are filled in the inode.

Step 24: Update the inode queue corresponding to the to-be-stored audio video data, such that each inode is arranged according to storage time of a corresponding frame of audio video data.

In summary, the method may include the following steps: obtaining an $n^{th}$ frame of data of the target data, the target data including N frames of data, wherein N is a natural number and n≤N; storing the $n^{th}$ frame of data in one or more free data blocks in a main storage partition of the at least one storage medium; obtaining, from an index node (inode) partition of the at least one storage medium, a free inode in an inode queue corresponding to the target data; storing indexing information of the $n^{th}$ frame of data in a space corresponding to the free inode, so as to facilitate retrieving of the $n^{th}$ frame of data; and updating the inode queue so that inodes in the inode queue are arranged according to a storage time sequence of the corresponding n frames of data.

Figure 3:
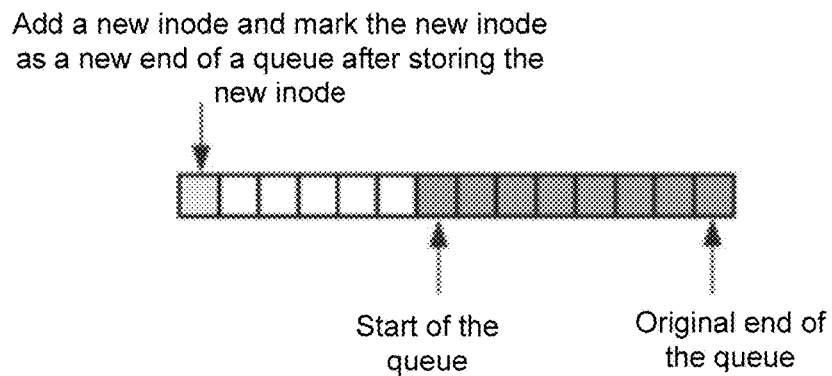
FIG. 3 is a schematic diagram of storing embedded audio video data according to some exemplary embodiments of this disclosure.

For example, referring to FIG. 3, if, from a start to an end of a queue, the inodes are stored in a collection time sequence in the inode loop queue, when a frame of audio video data is newly added, only index information needs to be recorded in an inode after the end of the original queue, and the inode is then marked as a new end of the queue. If the end of the original queue has reached the end of allocated address space, the inode will continue to record from the start of the address space, and this process may be repeated.

In some exemplary embodiments, there may be usually two ways of playing the audio video: one is to play in sequence, and the other is to play after jumping. When the audio video is played in sequence, the solution of this disclosure may be adopted. Since the inode loop queue has been arranged in the sequence of timestamp of the audio video, when retrieving the audio video data according to a "play in sequence" instruction, the audio video data from the flash memory, relevant data may be read and continuous playing of the video may be realized when adjacent inodes in the inode loop queue is accessed in a sequence of an array.

Figure 4:
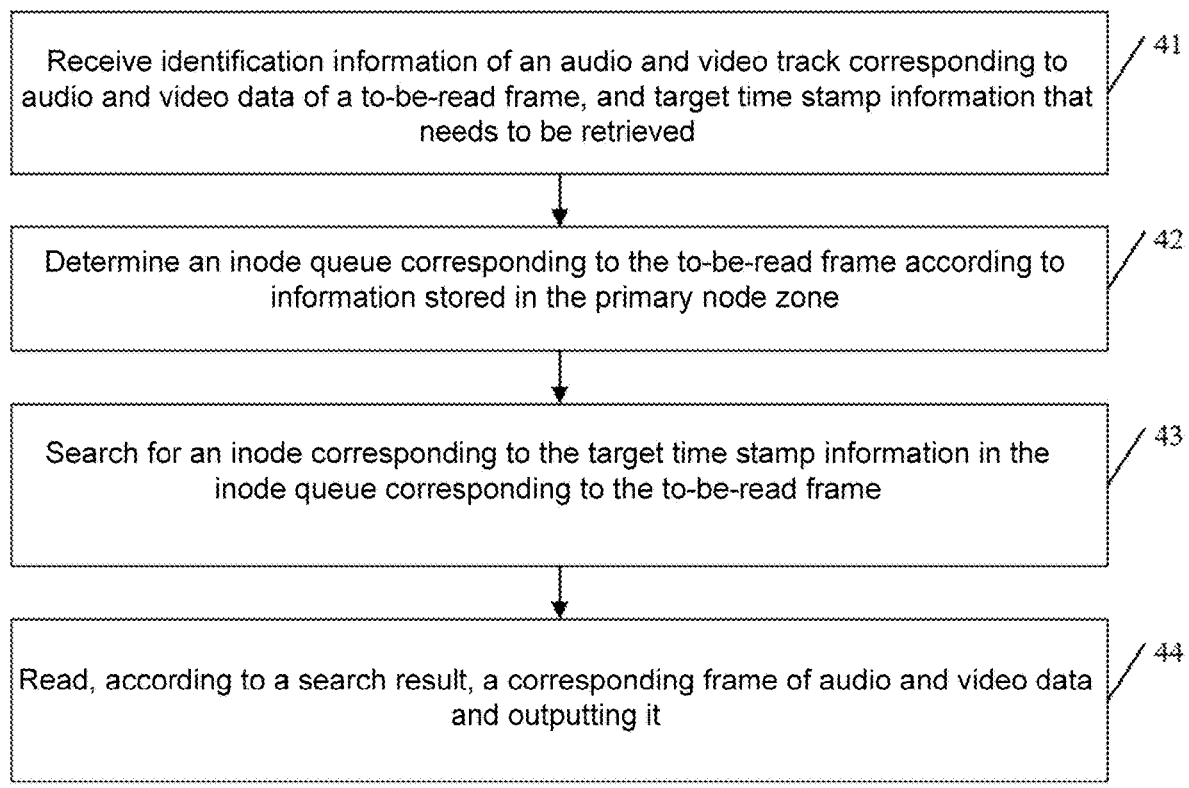
FIG. 4 is a flowchart of a method for retrieving embedded audio video data according to some exemplary embodiments of this disclosure.
Figure 9:
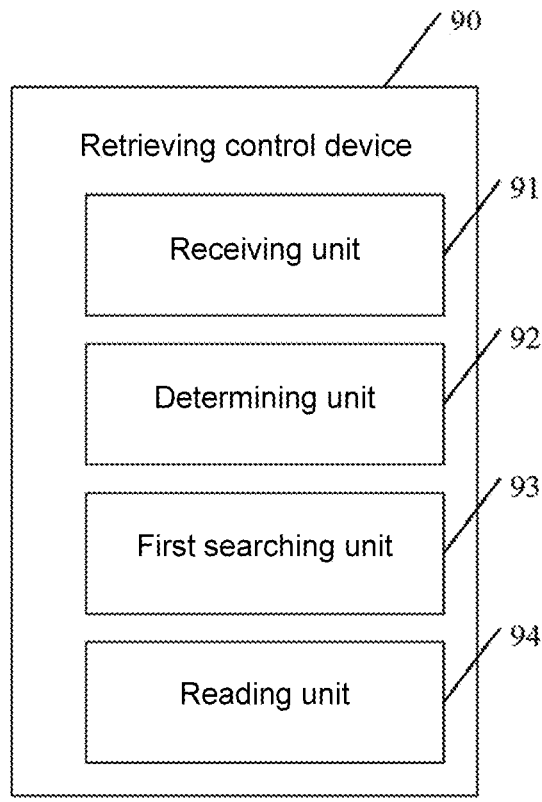
FIG. 9 is a schematic diagram of a retrieving control device for embedded audio video data according to some exemplary embodiments of this disclosure.

For the way of playing after jumping, some exemplary embodiments of the disclosure provide a method for retrieving embedded audio video data, where the method is used to retrieve the audio video data from the flash memory. The method may be executed by an electronic retrieving control device 90, as shown in FIG. 9. Referring to FIG. 4, the method may include the following steps.

Step 41: Receive identification information of an audio video track corresponding to audio video data of a to-be-read frame, and target timestamp information that needs to be retrieved.

The way of playing after jumping in the exemplary embodiment of this disclosure may be that a user inputs target timestamp information to be retrieved by dragging the timeline on the operation interface, or that a user inputs specific structural information (for example, information of people, pets appearing in the video) and uses an AI algorithm to parse the images in the video to determine the target timestamp information to be retrieved. In other words, whether the user directly inputs the target timestamp information to be retrieved or indirectly inputs the target timestamp information to be retrieved through other means, once the target timestamp information to be retrieved is obtained, the audio video data of a corresponding frame may be output on the audio video track corresponding to the audio video data of the to-be-read frame through the method described above.

In some exemplary embodiments, the identification information of the audio video track corresponding to the audio video data of the to-be-read frame may be obtained based on the user's input operation. For example, when a user clicks a video on the operating interface, the corresponding identification information of the audio video track may be input.

Step 42: Determine an inode queue corresponding to the to-be-read frame based on information stored in the main node partition.

In some exemplary embodiments, after the identification information of the audio video track corresponding to the audio video data of the to-be-read frame is obtained, the corresponding inode queue may be determined based on the identification information of the audio video track since the main node partition stores information about a correspondence between the audio video track and the inode queue.

Step 43: Retrieve an inode corresponding to the target timestamp information from the inode queue corresponding to the to-be-read frame.

In some exemplary embodiments, since each inode in the inode queue stores the timestamp information of the corresponding frame, the timestamp information of each inode is compared with the target timestamp information to obtain the inode corresponding to the target timestamp information.

In some exemplary embodiments of this disclosure, since the inode loop queue is arranged according to the sequence of timestamp, a binary search method may be used to quickly locate, according to the timestamp, a relevant frame of audio video in the loop queue, such that the retrieval efficiency is greatly improved.

Figure 5:
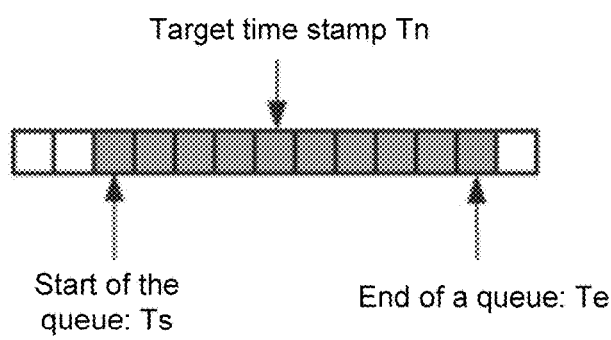
FIG. 5 is a schematic diagram of retrieving embedded audio video data according to some exemplary embodiments of this disclosure.

Specifically, referring to FIG. 5, if a timestamp at an end of the inode loop queue is Te and the timestamp at a start of the inode loop is Ts, and the target timestamp is Tn, the corresponding inode may be found within $O(\log n)$ time complexity by using the binary search method, where n is the number of inodes in the inode loop queue. The searching efficiency of this method is much higher compared to that of the traditional sequence search method.

Step 44: Read, based on a search result, a corresponding frame of audio video data and output it.

In summary, a method for retrieving target data from at least one storage medium may include: receiving identification information of the target data and timestamp information of an $i^{th}$ frame of data, wherein the target data includes N frames of data, N is a natural number, and i≤N; determining a target index node (inode) queue corresponding to the target frame based on metadata information stored in a main node partition of the at least one storage medium; searching for a target inode corresponding to the target timestamp information in the target inode queue; and outputting, based on a search result, a frame of the target data corresponding to the target inode.

In some exemplary embodiments, the inode corresponding to the target timestamp information may be obtained, and the audio video data of the corresponding frame is then read and played back.

Compared to the existing technologies in which a file system is used to store and manage a video, the scheme described above for retrieving the embedded audio video data does not need to slowly traverse throughout the file content to address the corresponding data, such that the retrieval efficiency is greatly improved.

In some exemplary embodiments, it is very rare to delete a video clip or audio clip in managing the audio video. In most cases, the earliest audio video clip in the Flash may be deleted in loops only when the Flash is already full.

Figure 6:
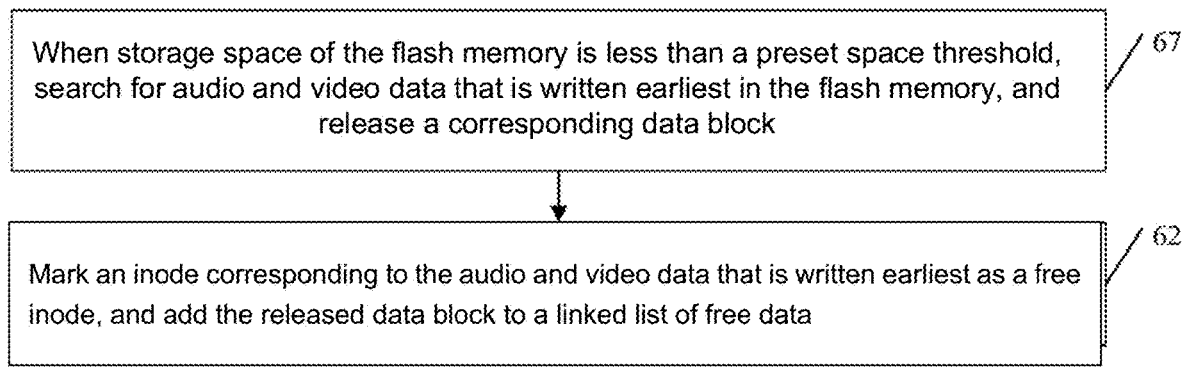
FIG. 6 is a flowchart of a method for deleting embedded audio video data according to some exemplary embodiments of this disclosure.
Figure 10:
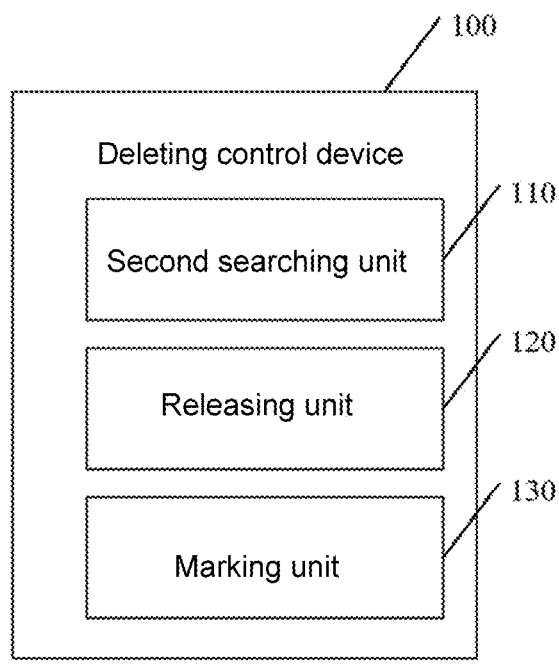
FIG. 10 is a schematic diagram of a deleting control device for embedded audio video data according to some exemplary embodiments of this disclosure.

Regarding how to delete audio video data from the flash memory when remaining storage space in Flash is small, some exemplary embodiments of this disclosure provide a method for deleting the embedded audio video data. The method may be executed by an electronic deleting control device 100, as shown in FIG. 10. Reference to FIG. 6, the method may include the following steps.

Step 61: When storage space of the flash memory is less than a preset space threshold, retrieve audio video data that is written earliest in the flash memory, and releasing a corresponding data block.

In some exemplary embodiments, the preset space threshold may be set according to an actual condition. The storage space of the flash memory may be less than the preset space threshold, which indicates that the remaining storage space in the flash memory is small and the audio video clips in the flash need to be deleted.

In some exemplary embodiments, the audio video data that is written earliest in the flash memory refers to the audio video data that is stored earliest in all inode queues corresponding to the flash memory, and the corresponding data block may be released after the audio video data that is stored earliest is deleted. The released data block may be a single data block or a linked list of a plurality of data blocks.

Step 62: Mark an inode corresponding to the audio video data that is written earliest as a free inode, and add the released data block to a linked list of free data block.

Figure 7:
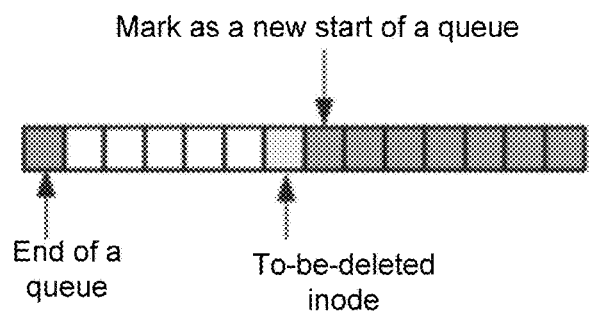
FIG. 7 is a schematic diagram of deleting embedded audio video data according to some exemplary embodiments of this disclosure.

In some exemplary embodiments, referring to FIG. 7, the inode at a start of a queue (that is, a to-be-deleted inode) is marked as the free inode, and the released data block is added to the linked list of free data block. Then, the start of the queue is moved to point to a next inode.

With the inode loop queue mechanism, it is easy to delete previous video data in loop when the Flash is full by releasing the frame of the audio video data at the start of the queue. Compared with a traditional file system managing the video data, the deletion operation in this disclosure does not need to traverse to find the earliest file, such that the deletion efficiency is greatly improved.

In order to enable those skilled in the art to better understand and realize this disclosure, the control devices corresponding to the above methods will be next described in detail.

Referring to FIG. 8, this disclosure further provides a storage control device 80 for storing embedded audio video data, which is applicable to storing the audio video data in the flash memory.

Figure 11:
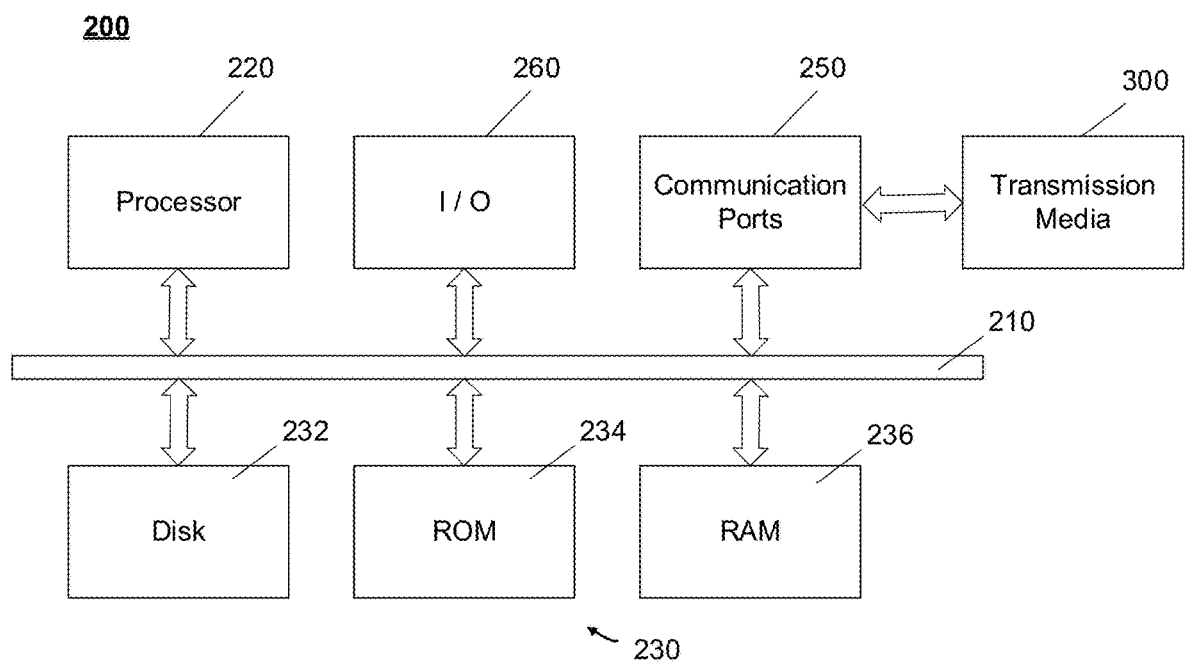
FIG. 11 shows a schematic diagram of a device for storing, retrieving, and/or deleting audio and/or video data according to some exemplary embodiments of the present disclosure.

The storage control device 80 may be a device as shown in FIG. 11, such as a driving recorder, a camcorder/camera, a mobile phone, computer, or tablet computer, which includes one or more storage media and one or more processors in communication with each other. The one or more storage media may store a set of instructions for storing audio video data. During operation, the one or more processors may read and execute the set of instructions to conduct the methods of storing control of audio video data introduced in the present disclosure.

Alternatively, the storage control device 80 may be a specially designed storage control circuit, such as a storage control circuit in a driving recorder, a camcorder/camera, a mobile phone, computer, or tablet computer etc. Specifically, the storage control device 80 is applicable to storing, by using the methods introduced in the present disclosure, each frame of audio video data in the flash memory in a unit of frame. The storage control device 80 may include an obtaining unit 81, a writing unit 82, a processing unit 83, and an updating unit 84. In some exemplary embodiments, the units in the storage control device may be a sub-circuit of the storage control device 80.

The obtaining unit 81 may be applicable to obtaining a free data block after obtaining an $n^{th}$ frame of audio video data, where the $n^{th}$ frame of audio video data is any frame of to-be-stored audio video data, and the to-be-stored audio video data includes N frames of data, where N≥1.

The writing unit 82 may be applicable to storing the $n^{th}$ frame of audio video data in the free data block.

The processing unit 83 may be applicable to obtaining a free inode from an inode queue corresponding to the to-be-stored audio video data as an inode of the $n^{th}$ frame of audio video data, and storing information of the $n^{th}$ frame of audio video data in a storage space corresponding to the inode of the $n^{th}$ frame of audio video data.

The updating unit 84 may be applicable to updating the inode queue corresponding to the to-be-stored audio video data, such that each inode is arranged according to storage time of a corresponding frame of audio video data.

Referring to FIG. 9, this disclosure further provides a retrieving control device 90 for retrieving embedded audio video data, which is applicable to retrieving the audio video data from the flash memory.

The retrieving control device 90 may be a device as shown in FIG. 11, such as a driving recorder, a camcorder/camera, a mobile phone, computer, or tablet computer etc. that displaying a video. The retrieving control device 90 may include one or more storage media and one or more processors in communication with each other. The one or more storage media may store a set of instructions for retrieving control of audio video data. During operation, the one or more processors may read and execute the set of instructions to conduct the methods of retrieving audio video data introduced in the present disclosure.

Alternatively, the retrieving control device 90 may be a specially designed retrieving control circuit, such as a retrieving control circuit in a driving recorder, a camcorder/camera, a mobile phone, computer, or tablet computer etc. The retrieving control device 90 may include a receiving unit 91, a determining unit 92, a first searching unit 93 and a reading unit 94. In some exemplary embodiments, the units in the retrieving control device 90 may be a sub-circuit of the retrieving control device 90.

The receiving unit 91 may be applicable to receiving identification information of an audio video track corresponding to audio video data of a to-be-read frame, and target timestamp information that needs to be retrieved;

The determining unit 92 may be applicable to determining an inode queue corresponding to the to-be-read frame according to information stored in the main node partition;

The first searching unit 93 may be applicable to searching for an inode corresponding to the target timestamp information in the inode queue corresponding to the to-be-read frame; and The reading unit 94 may be applicable to reading, according to a search result, a corresponding frame of audio video data and outputting it.

Referring to FIG. 10, this disclosure further provides a deleting control device 100 for deleting embedded audio video data, which is applicable to deleting the audio video data from the flash memory.

The deleting control device 100 may be a device as shown in FIG. 11, such as a driving recorder, a camcorder/camera, a mobile phone, computer, or tablet computer etc. The deleting control device 100 may include one or more storage media and one or more processors in communication with each other. The one or more storage media may store a set of instructions for deleting control of audio video data. During operation, the one or more processors may read and execute the set of instructions to conduct the corresponding audio video data deleting control methods introduced in the present disclosure.

Alternatively, the deleting control device 100 may be a specially designed retrieving control circuit, such as a deleting control circuit in a driving recorder, a camcorder/camera, a mobile phone, computer, or tablet computer etc. As shown in FIG. 10, the deleting control device 100 may include: a second searching unit 110, a releasing unit 120 and a marking unit 130. In some exemplary embodiments, the units in the deleting control device 100 may be a sub-circuit of the deleting control device 100.

The second searching 110 unit may be applicable to searching for audio video data that is written earliest in the flash memory when storage space of the flash memory is less than a preset space threshold;

The releasing unit 120 may be applicable to releasing a corresponding data block that is written earliest in the audio video data; and The marking unit 130 may be applicable to marking an inode corresponding to the audio video data that is written earliest as a free inode, and adding the released data block to a linked list of free data block.

FIG. 11 shows a schematic diagram of an electronic device for storing, retrieving, and/or deleting audio and/or video data according to some exemplary embodiments of the present application. The device 200 may execute the audio and/or video data processing methods as described in the present application. For example, the device 200 may be a camcorder/camera, a driving recorder, a mobile phone, computer, or tablet computer etc.

The device 200 may include at least one storage medium 230 and at least one processor 220. In some exemplary embodiments, the device 200 may further include a communication port 250 and an internal communication bus 210. Meanwhile, the device 200 may also include an I/O component 260, such as one or more audio and/or video capturing device (e.g., a lens, camera, microphone, etc.) and audio and/or video displaying device (e.g., a speaker, a display/screen, a projector, etc.).

The internal communication bus 210 may connect different system components, including the storage medium 230 and the processor 220.

The I/O component 260 may support the input/output between the data compression device 200 and other components.

The storage medium 230 may include a data storage device. The data storage device may be a non-transitory storage medium or a temporary storage medium. For example, the data storage device may include one or more of a magnetic disk 232, a read-only storage medium (ROM) 234, and a random access storage medium (RAM) 236. The storage medium 230 may also include at least one set of instructions stored in the data storage device. The instructions are computer program code, and the computer program code may include the programs, routines, objects, components, data structures, processes, modules, etc. for executing the data processing method as provided by the present application.

The communication port 250 may be used for data communication between the data compression device 200 and the outside world. For example, the data compression device 200 may be connected to the transmission medium 300 through the communication port 250.

The at least one processor 220 may be in the communication connection with the at least one storage medium 230 via the internal communication bus 210. During operation, the at least one processor 220 may reads and execute the at least one set of instructions to perform the audio and/or video data processing methods accordingly. In some embodiments, the at least one processor 220 may include one or more hardware processors. Examples of the hardware processors may include microcontrollers, microprocessors, reduced set of instructions computers (RISC), application specific integrated circuits (ASICs), application-specific set of instructions processors (ASIP), central processing units (CPU), graphics processing units (GPU), physical processing units (PPU), microcontroller units, digital signal processors (DSP), field programmable gate arrays (FPGA), advanced RISC machines (ARM), programmable logic devices (PLD), or any circuit or processor that is capable of executing one or more functions, or any combination thereof.

Some exemplary embodiments of this disclosure further provides a non-transitory computer-readable storage medium on which a computer program is stored, where the computer program is executed by a processor to implement the steps in any one of the methods described above.

In some exemplary embodiments, the computer-readable storage medium may include a ROM, a RAM, a magnetic disk, an optical disk, or the like.

Although being disclosed as above description, this disclosure is not limited to the description. Those skilled in the art can make various changes and modifications without departing from the scope of this disclosure. Therefore, the scope of protection of this disclosure shall be subject to the scope defined by the claims.

What is claimed is:

1. A non-transitory computer-readable storage medium, comprising:

a main storage partition configured to store target data, the target data including a plurality of frames of data;

an index node (inode) partition configured to store a plurality of inodes, forming an inode queue, wherein each inode includes indexing information of one or more of the frames in the target data, so as to facilitate retrieving of one or more frames corresponding to the inode, and each inode is further configured to store:
frame header information of the frames of the target data, and
sequence parameter set (SPS), picture parameter set (PPS) and supplemental enhancement information (SEI) information of the frames of the target data.

2. The storage medium according to claim 1, wherein the target data includes at least one of audio track data, video track data, or audio video track data; and
each frame of data in the plurality of frames of data includes at least one of an audio data frame of the audio track data, a video data frame of the video track data, or an audio video data frame of the audio video track data.

3. The storage medium according to claim 1, wherein the main storage partition includes a plurality of data blocks configured to store at least a portion of a frame of the target data; and
each inode in the inode queue corresponds to at least one data block of the plurality of data blocks.

4. The storage medium according to claim 3, wherein the indexing information includes timestamp information and storage location information of a frame in the corresponding at least one data block; and
the plurality inodes in the inode queue is arranged according to a storage time sequence of the plurality of frames of the target data.

5. The storage medium according to claim 1, further comprising a main node partition to store metadata, the metadata including at least one of:
storage information of a chip where the storage medium is located;
information of the inode queue corresponding to the target data in the inode partition; or
header information of a management linked list of a free data block in the main storage partition.

6. A method for storing target data in at least one storage medium, comprising:
obtaining an $n^{th}$ frame of data of the target data, the target data including N frames of data, wherein N is a natural number and n≤N;
storing the $n^{th}$ frame of data in one or more free data blocks in a main storage partition of the at least one storage medium;
obtaining, from an index node (inode) partition of the at least one storage medium, a free inode in an inode queue corresponding to the target data;
storing indexing information of the $n^{th}$ frame of data in a space corresponding to the free inode, so as to facilitate retrieving of the $n^{th}$ frame of data; and
updating the inode queue so that inodes in the inode queue are arranged according to a storage time sequence of the corresponding n frames of data.

7. The method according to claim 6, wherein the target data includes at least one of audio track data, video track data, or audio video track data; and
each frame of data in the plurality of frames of data includes at least one of an audio data frame of the audio track data, a video data frame of the video track data, or an audio video data frame of the audio video track data.

8. The method according to claim 6, wherein the main storage partition includes a plurality of data blocks configured to store at least one frame of the target data; and
each inode in the inode queue corresponds to at least one data block of the plurality of data blocks.

9. The method according to claim 8, wherein the indexing information includes timestamp information and storage location information of a frame of data in the corresponding at least one data block.

10. The method according to claim 6, further comprising:
storing metadata information in a main node partition of the storage medium, the metadata information including at least one of:
storage information of a chip where the storage medium is located;
information of the inode queue corresponding to the target data in the inode partition; or
header information of a management linked list of a free data block in the main storage partition.

11. The method according to claim 6, further comprising:
determining that a linked list of free data block in the main storage partition includes insufficient free data blocks;
retrieving an earliest frame of the target data from the main storage partition;
releasing spaces in one or more data blocks corresponding to the earliest frame;
repeating the retrieving and releasing until enough space is released to store the $n^{th}$ frame of data.

12. The method according to claim 6, wherein the updating of the inode queue includes:
placing the inode of the $n^{th}$ frame of the target data as an end inode of the inode queue corresponding to the target data.

13. A method for retrieving target data from at least one storage medium, comprising:
receiving identification information of the target data and timestamp information of an $i^{th}$ frame of data, wherein the target data includes N frames of data, N is a natural number, and i≤N;
determining a target index node (inode) queue corresponding to the target frame based on metadata information stored in a main node partition of the at least one storage medium;
searching for a target inode corresponding to the target timestamp information in the target inode queue; and
outputting, based on a search result, a frame of the target data corresponding to the target inode.

14. The method according to claim 13, wherein
the searching for the target inode corresponding to the target timestamp information is performed using a binary method.

15. The method according to claim 13, wherein the target data includes at least one of audio track data, video track data, or audio video track data; and
each frame of data in the plurality of frames of data includes at least one of an audio data frame of the audio track data, a video data frame of the video track data, or an audio video data frame of the audio video track data.

16. The method according to claim 13, wherein the main storage partition includes a plurality of data blocks configured to store at least one frame of the target data; and
each inode in the inode queue corresponds to at least one data block of the plurality of data blocks.

17. The method according to claim 16, wherein the indexing information including timestamp information and storage location information of a frame in the corresponding at least one data block.

18. The method according to claim 13, further comprising:
   storing metadata information in a main node partition of the storage medium, the metadata information including:
      storage information of a chip where the storage medium is located;
      information of the inode queue corresponding to the target data in the inode partition; or
   header information of a management linked list of a free data block in the main storage partition.

19. The method according to claim 13, wherein inodes in the target inode queue is arranged according to a storage time sequence of the N frames of the target data.

* * * * *